United States Patent [19]
Iwashige

[11] Patent Number: 5,798,025
[45] Date of Patent: Aug. 25, 1998

[54] APPARATUS FOR SCREENING WASTE PAPER PULP

[75] Inventor: Naoyuki Iwashige, Yokohama, Japan

[73] Assignees: Ishikawajima-Harima Jukogyo Kabushiki Kaisha; Ishikawajima Sangyo Kikai Kabushiki Kaisha, both of Tokyo-to, Japan

[21] Appl. No.: 816,897

[22] Filed: Mar. 13, 1997

[51] Int. Cl.$^6$ .............................. B01D 29/00; D21D 5/02
[52] U.S. Cl. .............................. 162/261; 162/380; 209/10; 209/273; 209/305; 241/46.17
[58] Field of Search .......................... 209/10, 273, 274, 209/305, 306; 162/4, 55, 380, 251, 261; 241/46.17

[56] References Cited

U.S. PATENT DOCUMENTS

| | | | |
|---|---|---|---|
| 5,564,572 | 10/1996 | Iwashige et al. | 209/10 |
| 5,597,075 | 1/1997 | Iwashige et al. | 209/10 |
| 5,622,267 | 4/1997 | Hautala | 209/305 |

FOREIGN PATENT DOCUMENTS

170289  7/1996  Japan .

*Primary Examiner*—Karen M. Hastings
*Attorney, Agent, or Firm*—Oblon, Spivak, McClelland, Maier & Neustadt, P.C.

[57] ABSTRACT

Separation and discharge of contaminants and defibration of undefibered waste paper can be effected in a single apparatus which has a generally cylindrical casing, a rotor concentrically arranged in the casing and a cylindrical main screen plate concentrically surrounding the rotor. Stock is separated by the main screen plate into that passing from inside through the main screen plate to outside and that not passing through it. The stock passing through the main screen plate is sent as accept stock to a next process. The stock not passing through the main screen plate is passed through a gap of a defibering section provided by defibration stator and rotor for defibration of undefibered waste paper and is further separated into the stock passing through an auxiliary screen plate and that not passing through it. The stock passing through the auxiliary screen plate is sent back through a circulation pathway in the rotor to inside of the main screen plate. Only the stock not passing through the auxiliary screen plate is discharged out of the system as the reject.

4 Claims, 9 Drawing Sheets

PRIOR ART

FIG. 9B ns025
APPARATUS FOR SCREENING WASTE PAPER PULP

BACKGROUND OF THE INVENTION

The present invention relates to an apparatus for screening waste paper pulp to separate contaminants from paper stock and to defiber undefibered waste paper in the field of industries using waste paper pulp as stock such as paper pulp and fiberboard industries.

In such industries, utilization of waste paper as paper stock will inevitably involve separation and removal of various contaminants such as plastics, vinyl strings and binding gum on magazines, which contaminants are intermingled during recovery of waste paper.

It has been longed that reusable contaminants, which are typically 1 to 3% by weight of the recovered waste paper, be more selectively separated and removed and that yield of paper stock be increased since the cost for recovery of waste paper accounts for a very high percentage in the total cost for utilization of waste paper as paper stock.

In general, contaminants which are larger in size than and/or much different in shape from pulp fiber are removed by an apparatus called screen.

Widely used as the screening apparatus is a closed pressurized one that accommodates a strainer with a number of pores. Efficiency or ratio of removing contaminants in the screen is closely related with reject ratio (quantitative ratio of the stock not passing through the strainer to the whole stock at entry) of the screen.

Figure 1:
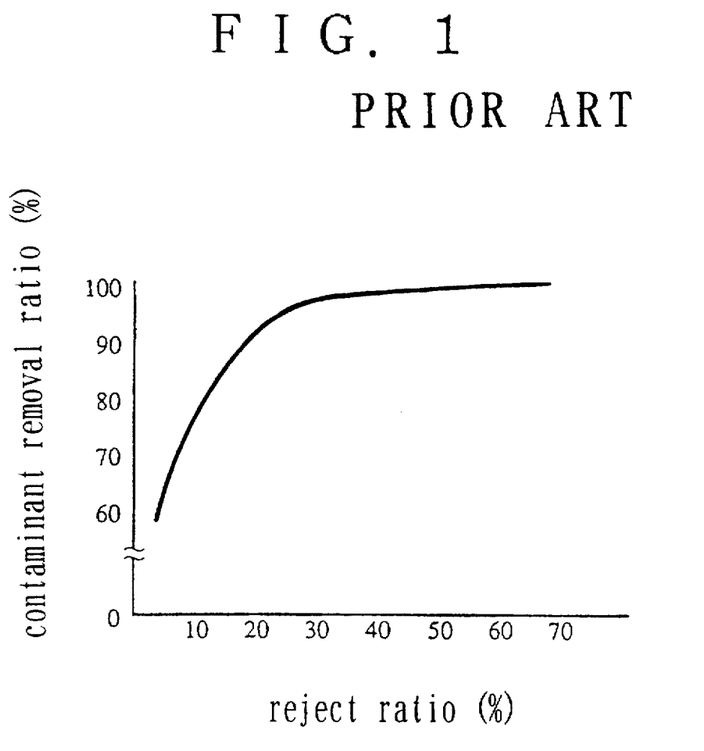
FIG. 1 is a diagram showing a relationship between reject ratio and contaminant removal ratio in a conventional screen.

As shown in FIG. 1, increase and decrease of reject ratio lead to enhancement and lowering of contaminant removal ratio, respectively.

Attempt to reduce the reject ratio in an ordinary screen will tend to cause plugging of the screen plate or of a reject valve due to increased reject consistency. Even if such plugging may be averted, extreme reduction of the reject ratio would worsen the effect of removing contaminants, failing to obtain sufficient screening effect.

Increase of the reject ratio to a certain extent is therefore required for obtaining pulp with less quantity of contaminants. However, increase of the reject ratio means reduction of yield of paper stock.

Generally, in order to overcome this problem in a screening apparatus, a reject ratio of 20 to 25% is selected, over which the curve shown in FIG. 1 becomes dull and the contaminant removal ratio is less affected; and the reject is re-processed by a so-called "multiple cascade flow" system to reduce the reject ratio in the whole of the system.

Pulp slurry sent to the screening process includes a large quantity of undefibered stock, which is larger in size than and/or different in shape from pulp fiber and exhibits behavior similar to that of the contaminants in the screening apparatus.

The yield of paper stock cannot be improved if such undefibered stock is separated and removed since the undefibered stock may become stock of very good quality when defibered.

For this reason, generally a screening system has a defibrator to defiber such undefibered stock.

The defibrator is often incorporated in the reject line of the screening system for efficient defibration.

Figure 2:
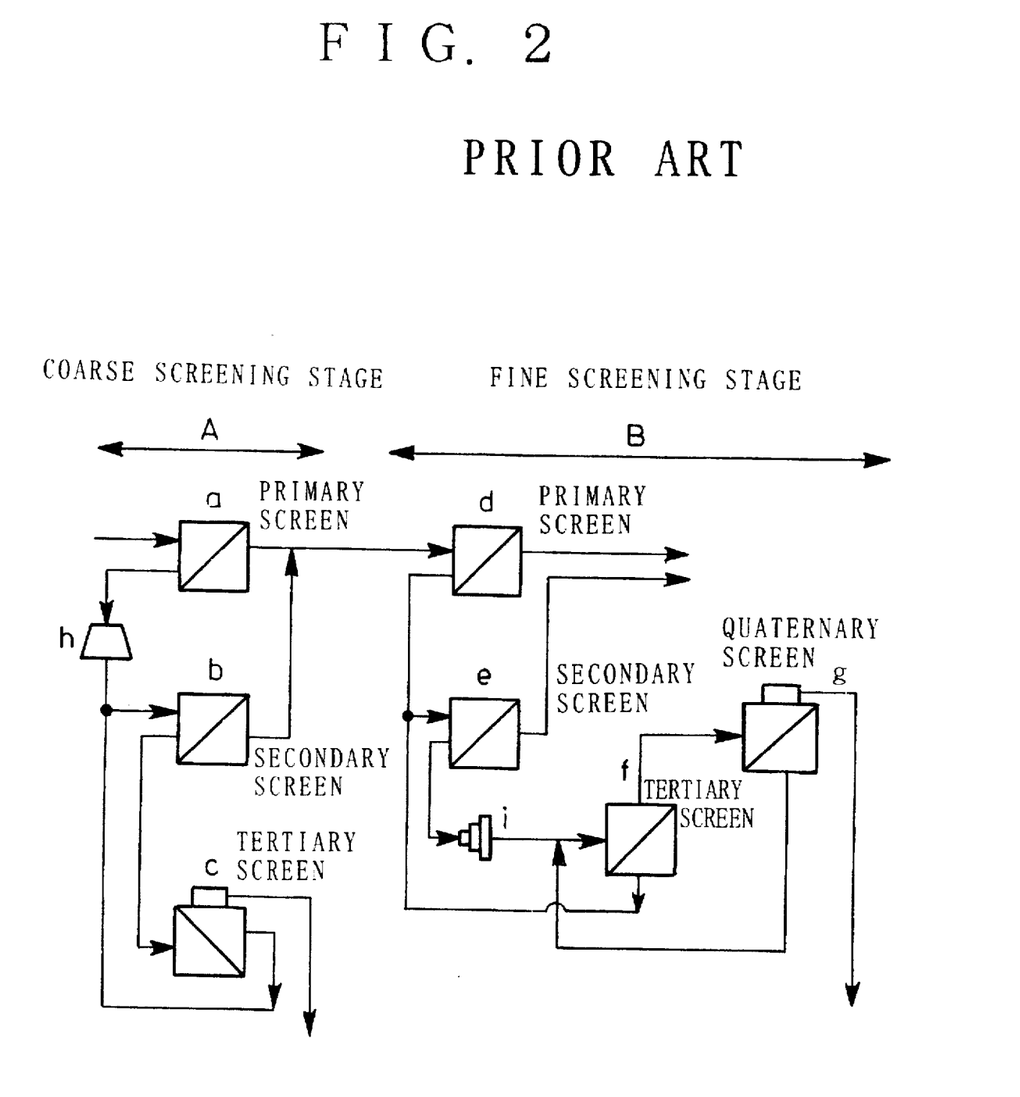
FIG. 2 is a flow sheet of a conventional screening process.

FIG. 2 shows a cascade flow system most commonly used. In general, a screening system utilizing multiple cascade flow is composed of a coarse screening stage A for removing relatively coarse contaminants and a fine screening stage B for removing finer contaminants.

In the coarse screening stage A, the reject from a primary screen a is defibered in a defiberator h and is then processed by a secondary screen b; and the accept stock in the secondary screen is joined with the accept stock from the primary screen a and is fed to the fine screening stage B. The reject from the secondary screen b is processed by a tertiary screen c and the accept stock from the tertiary screen is returned to the secondary screen b. Only the reject from the tertiary screen c is discharged out of the system. In the fine screening stage B, the accept stock from the coarse screening stage A is processed by a primary screen d and the reject from the primary screen is processed by a secondary screen e. The accept stock from the secondary screen is joined with the accept stock from the primary screen d and is discharged as the stock accepted in the system. The reject from the secondary screen e is defibered in a defiberator i and is then processed by a tertiary screen f. The accept stock from the tertiary screen is returned to the secondary screen e. The reject from the tertiary screen f is processed by a quaternary screen g. The stock accepted at the quaternary screen is returned to the tertiary screen f and only the reject from the quaternary screen g is discharged out of the system.

As is clear from the above, the more the number of screens in the cascade process is increased, the more the degree of screening and production yield can be enhanced, but disadvantageously the more the scale and cost of the facilities increase and the higher the power required to operate the screening system is.

To solve the above problems, the inventor of the invention and a co-inventor have proposed in JP-A-5-284225 and its corresponding U.S. Pat. No. 5,564,572 an apparatus for screening waste paper pulp in which screening and defibering sections are provided in one and the same screen and the reject defibered is diluted for circulation to the screening sections, thereby satisfying contradictory requirements, i.e., to increase contaminant removing efficiency, to raise production yield and to attain space- and cost-saving as well as facilitation in control of the system.

The proposed apparatus exhibits very good effects in application to a fine screening stage of a screening system. However, when it is applied to a coarse screening stage, contaminants, especially string-like ones, are often caught during circulation in the system to decrease processing ability.

In view of the above, an apparatus for screening waste paper pulp according to the invention was made and comprises a generally cylindrical casing having a stock inlet, an accept stock outlet and a reject outlet, a cylindrical main screen plate concentrically fixed to define a space between an inner surface of said casing and said main screen plate, an annular defibration stator concentrically disposed adjacent to an end of said main screen plate near said reject outlet, an auxiliary screen plate spaced apart from said defibration stator and fixed to define a space between an inner surface of said casing and said auxiliary screen plate, a rotor rotated around an axis of said casing, whereby said casing is partitioned into an inlet chamber communicated with said stock inlet and a space inside said main screen plate, an accept stock chamber outside said main screen plate and communicated with the accept stock outlet, a reject chamber communicated with said reject outlet and a circulation chamber outside said auxiliary screen plate, said rotor having main scraper blades faced to said main screen plate for preventing plugging of the main screen plate, a defibration rotor faced to said defibration stator and auxiliary scraper blades faced to said auxiliary screen plate for preventing plugging of the auxiliary screen plate, a circulation pathway opened to the circulation chamber, and circulation outlets on a peripheral wall of the circulation pathway for discharging the stock passing through the auxiliary screen plate toward the main screen plate, said defibration stator and defibration rotor having mutually facing surfaces divergent toward said reject chamber.

Preferably, said casing is provided with a dilution water inlet to said reject chamber.

The auxiliary screen plate may be in the form of a disk or a cylinder.

Preferably, the accept stock chamber is partitioned into two chambers closer to said inlet and reject chambers, respectively.

A pore strainer or a slit strainer may be utilized as the screen plate.

In the apparatus for screening waste paper pulp according to the invention as described above, waste paper stock pulp slurry containing undefibered waste paper is introduced into the main screen section to separate the slurry into the stock passing through the main screen plate and that not passing through it. The stock passing through the main screen plate is sent as the accept stock to the next process whereas the stock not passing through it is passed through the gap of the defibering section comprising the defibration stator and rotor so that undefibered waste paper in the stock is defibered and the stock is increased in pressure and is discharged into the reject chamber. The stock discharged into the reject chamber is further separated into the stock passing through the auxiliary screen plate and that not passing through it. The stock passing through the auxiliary screen plate is sent through the circulation pathway in the rotor and is circulated to the main screen section and only the stock not passing through the auxiliary screen plate is discharged out of the system as the reject.

Therefore, contaminants, especially string-like ones are not circulated to the main screen section and no troubles occur such as trapping or plugging due to the contaminants. The system can be readily applied to any coarse screening stage containing higher ratio of contaminants.

DETAILED DESCRIPTION OF PREFERRED EMBODIMENTS

Embodiments of the present invention will be detailedly described in conjunction with the accompanying drawings.

Figure 3:
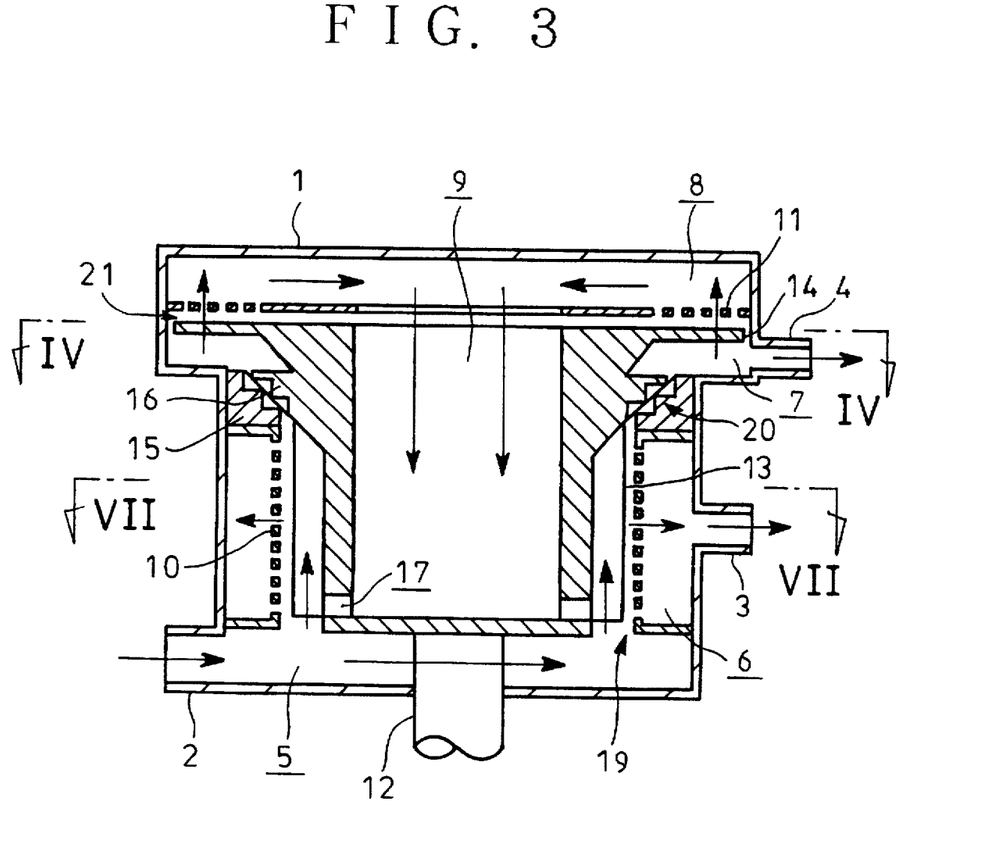
FIG. 3 is a front view in section of an apparatus for screening waste paper pulp according to a preferred embodiment of the present invention.
Figure 4:
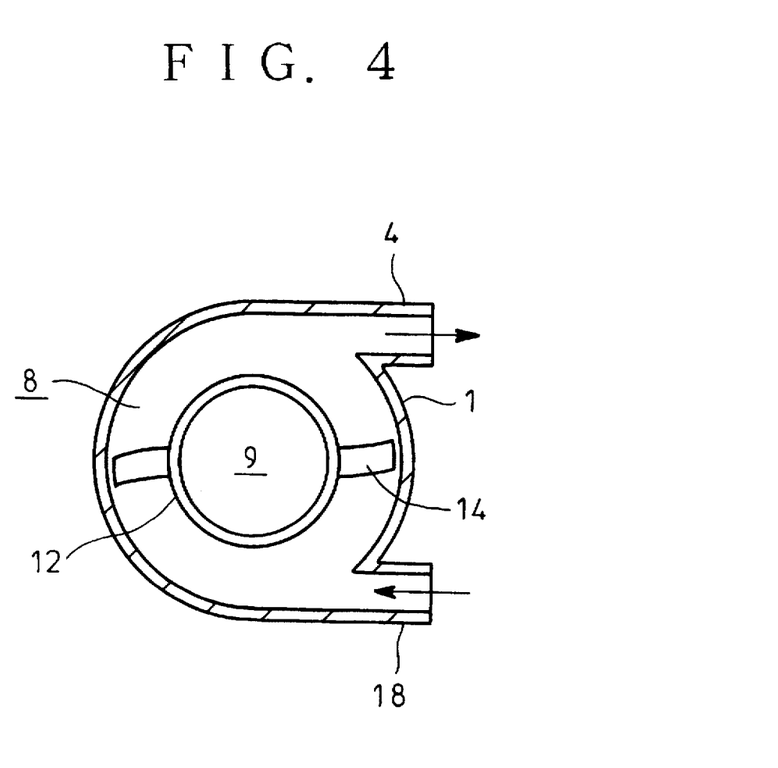
FIG. 4 is a view looking in the direction of arrows IV—IV in FIG. 3.

FIG. 3 is a front view in section of the apparatus and FIG. 4, a view looking in the direction of arrows IV—IV in FIG. 3.

In the figures, arrows indicate flows of stock and dilution water. Reference numeral 1 represents a casing in the form of superimposed smaller and larger cylinders. The casing 1 has a stock inlet 2 at its lower end, an accept stock outlet 3 at its intermediate portion and a reject outlet 4 and a dilution water inlet 18 at its upper portion.

The casing 1 has a cylindrical main screen plate 10 concentrically fixed in the casing 1 to define an accept stock chamber 6 between an inner surface of the casing 1 and the main screen plate 10. The casing 1 further has an annular defibration stator 15 concentrically disposed in the casing 1 adjacent to and above the main screen plate 1 as well as a rotor 12 rotated by a drive unit (not shown) around an axis of the casing 1.

The casing 1 has at its inner lower end an inlet chamber 5 which is communicated with the stock inlet 2 and with a space inside the main screen plate 10.

The casing 1 further has at its inner upper portion a reject chamber 7 which is communicated with the reject outlet 4.

The casing 1 has at its upper end an auxiliary screen plate 11 in the form of an annular disk. The auxiliary screen plate 11 is fixed in the casing 1 for partitioning of the reject chamber 7 to define a circulation chamber 8 between the inner surface of the casing 1 and the auxiliary screen plate 11. The rotor 12 has at its outer periphery main. scraper blades 13 facing to the main screen plate 10.

Figure 7:
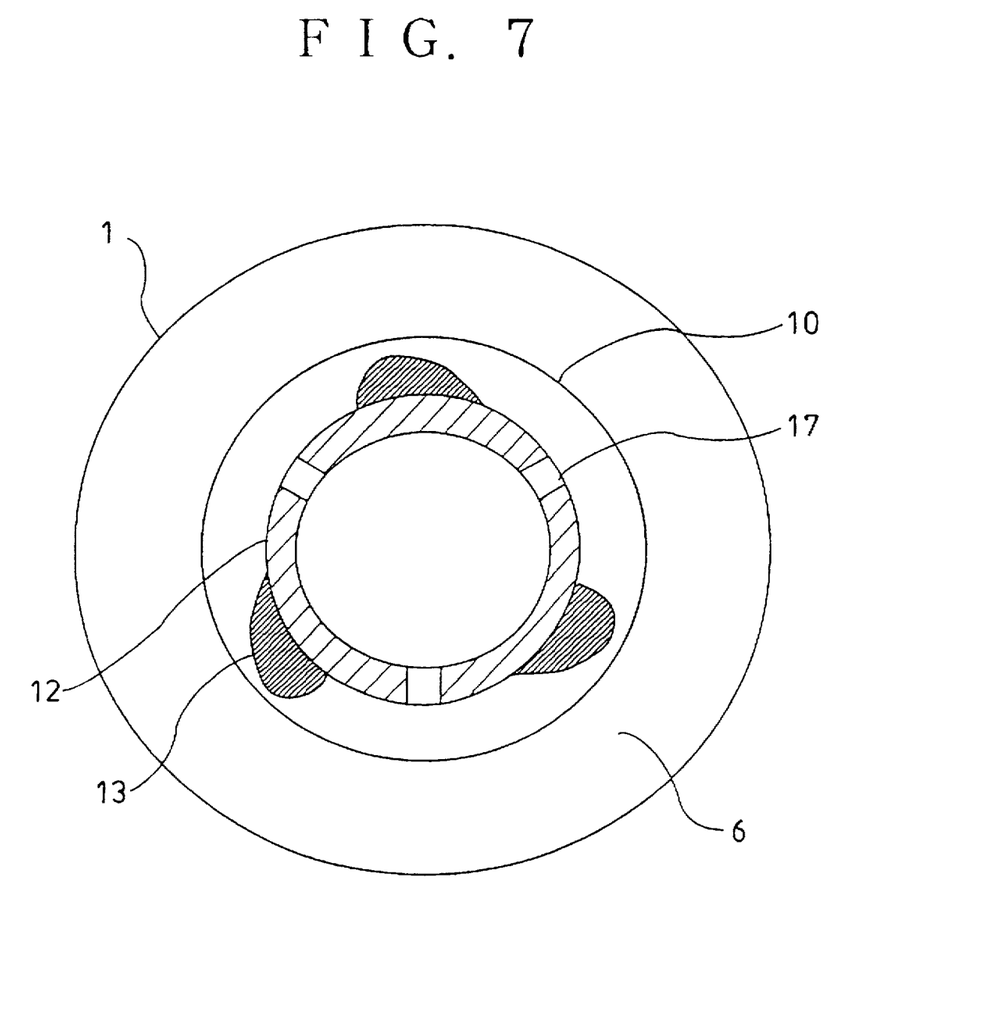
FIG. 7 is a view looking in the direction of arrows VII—VII in FIG. 3.

The main scraper blades 13 are of substantially arc section as shown in FIG. 7 (a view looking in the arrows VII—VII in FIG. 3), the number of the scraper blades 13 being usually two to eight depending upon the size of the screen. A gap between the scraper blades 13 and the screen plate 10 is 0.5 to 10 mm. The scraper blades 13 are rotated at a speed as high as 10 to 25 m/s inside the screen plate 10.

The scraper blades 13 and the main screen plate 10 provide a main screen section 19.

Figure 8A:
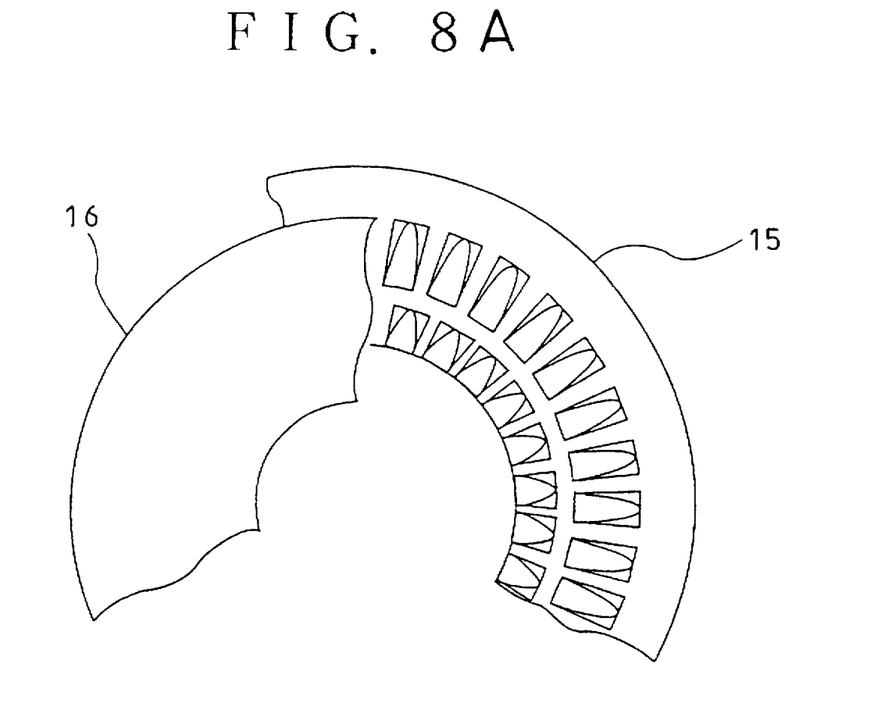
FIG. 8A is a fragmentary plan view of a defibrator used in the first embodiment.
Figure 8B:
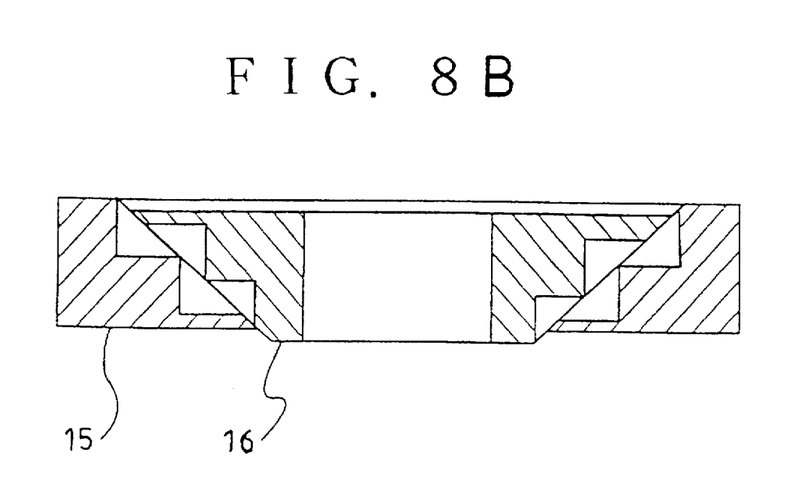
FIG. 8B is a sectional view of the defibrator shown in FIG. 8A.

The rotor 12 has at its intermediate portion a defibration rotor 16 disposed adjacent to the scraper blades 13. The defibration rotor 16 and the defibration stator 15 which is fixed to the casing 1 provide a defibering section 20. The defibering section 20 may be designed as shown in FIGS. 8A and 8B such that frustoconical work surfaces of the stator 15 and rotor 16 diverged toward the reject chamber 7 are faced to each other with a slight gap and have a number of pockets formed circumferentially and in two steps in a direction of generating line. The two steps of pockets, i.e., the smaller- and larger-diameter pockets serve as inlet and outlet, respectively.

The rotor 12 has at its upper portion auxiliary scraper blades 14 which are spaced apart from the defibration rotor 16 and faced to the auxiliary screen plate 11.

As shown in FIG. 4, each of the auxiliary scraper blades 14 is designed in the form of a wing with sweepback angle, the number of the scraper blades 14 being usually two to four depending upon the size of the screen.

As the main and auxiliary screen plates 10 and 11, pore strainers with pore diameter on the order of 0.5 to 5 mm and on the order of 1 to 10 mm. respectively. may be used. Preferably, the pores of the screen plate 11 are larger than those of the screen plate 10.

Alternatively, a slit strainer may be used as the main screen plate 10 to enhance the screening degree of the main screen plate.

The rotor 12 has an inner, cylindrical circulation pathway 9 which is opened upward to be communicated with the circulation chamber 8. A peripheral wall of the circulation pathway 9 is formed with circulation openings 17 directed to a lower portion of the main screen plate 10, the number of the circulation openings 17 being usually two to eight depending upon the size of the screen.

Figure 9A:
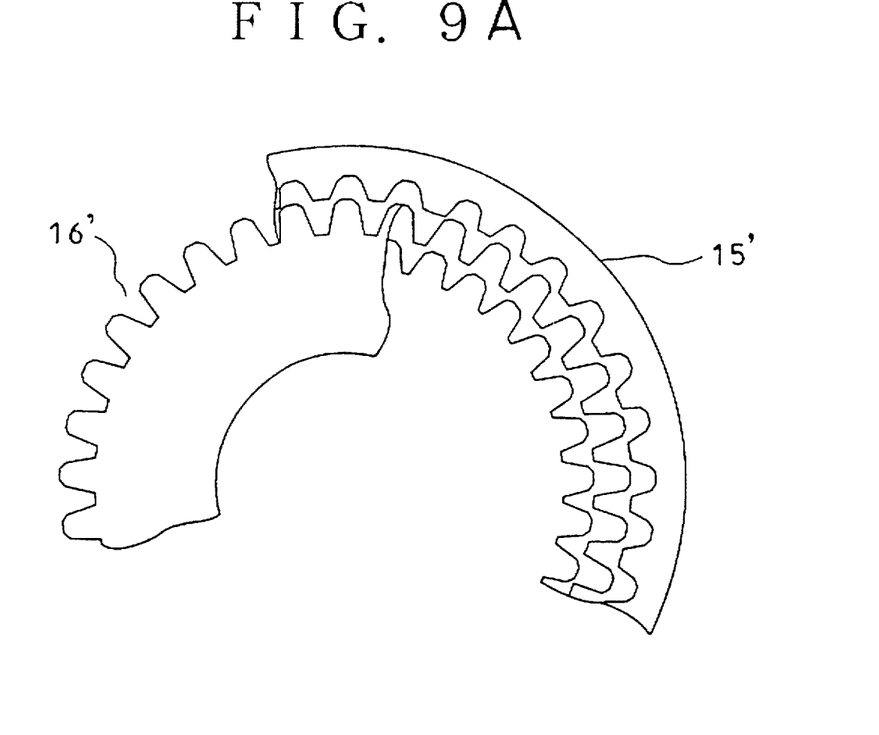
FIG. 9A is a fragmentary plan view of a variation of the defibrator.
Figure 9B:
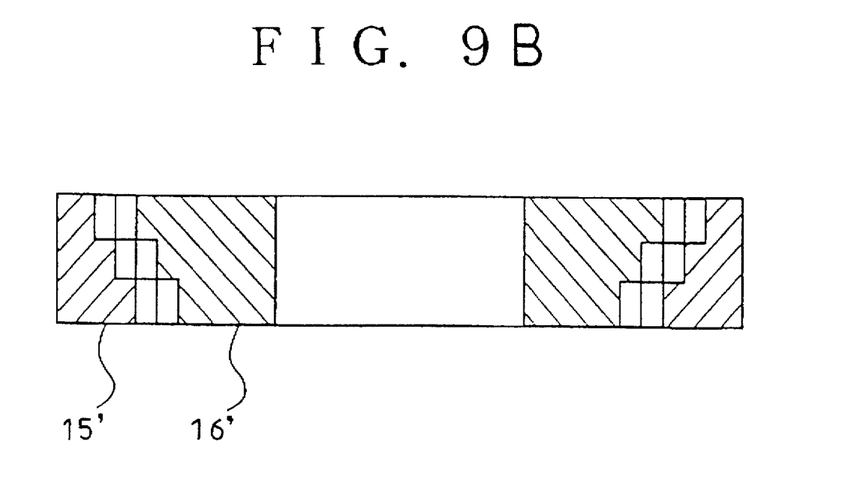
FIG. 9B is a sectional view of the defibrator shown in FIG. 9A.

The shape of the defibering section 20 is not limited to that shown in FIGS. 8A and 8B and may be as shown in FIGS. 9A and 9B where an inner periphery of the defibration stator 15' and an outer periphery of the defibration rotor 16' which is rotated with a slight gap from the stator 15' respectively have steps with increased diameters toward the flowing direction of stock, the respective steps having tooth shape similar to spur gear.

Figure 5:
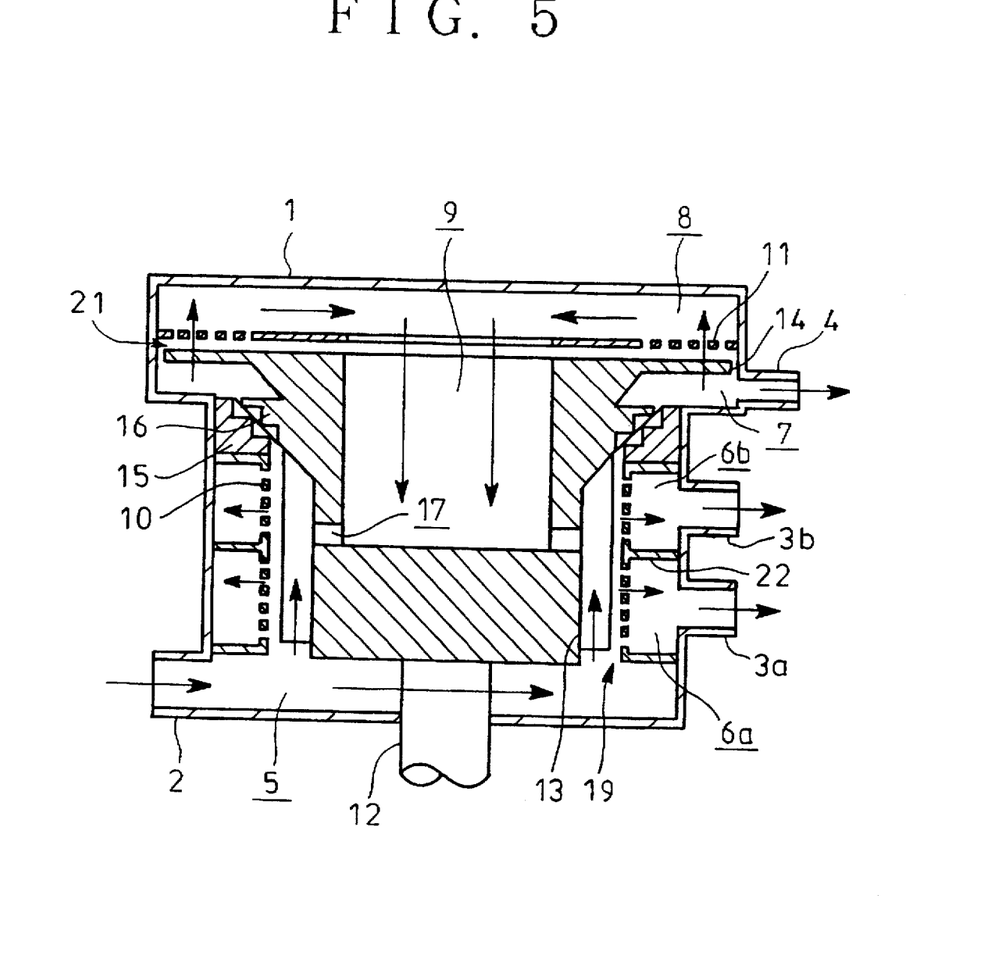
FIG. 5 is a front view in section of a further embodiment.

In the main screen section 19, there may be difference in screening degree between the stocks screened initially and terminally of the process. For this reason, the accept stock chamber 6 may be divided by an annular partition 22 to primary and secondary accept stock chambers 6a and 6b as shown in FIG. 5, each of the chambers 6a and 6b having an accept stock outlet for discharge of the accept stock to a process suitable for the screening degree of the stock.

In this case, the circulation openings 17 are formed to be directed to the secondary accept stock chamber 6b since the highly screened stock is circulated.

Figure 6:
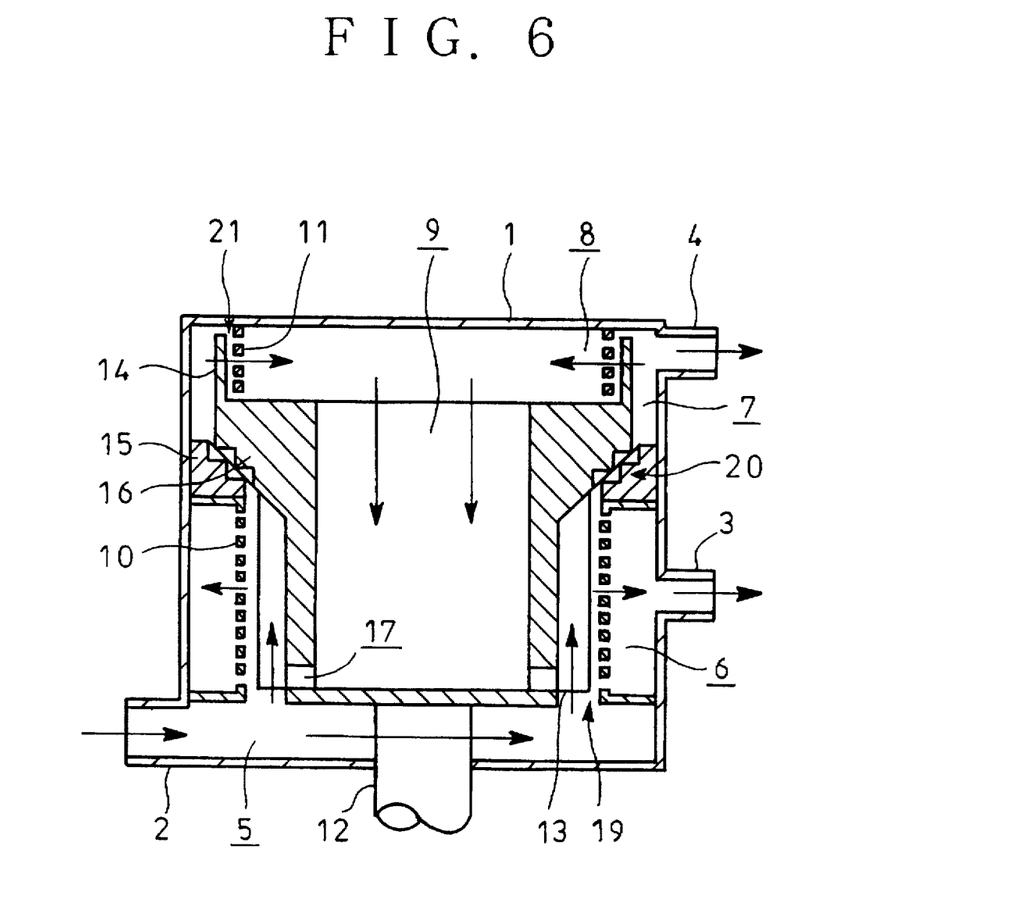
FIG. 6 is a front view in section of a still further embodiment.

Further, the auxiliary screen section 21 may be provided as shown in FIG. 6.

In FIG. 6, the auxiliary screen plate 11 in the form of a cylinder is concentrically fixed to the upper end of the casing 1 to define the reject chamber 7 between the screen plate 11 and the inner surface of the casing 1, the auxiliary scraper blades 14 extending in the reject chamber 7 to face to the screen plate 11.

Though not shown in the figure, the circulation chamber 8 may be provided with a reject nozzle to discharge contaminants light in weight such as foamed polystyrene.

Next, mode of operation of the first embodiment of the present invention will be described with reference to FIG. 3.

Waste paper stock pulp slurry containing undefibered waste paper is introduced through the stock inlet 2 into the inlet chamber 5 and is sent to the main screen section 19 where it is divided into the stock passing through the main screen plate 10 and that not passing through it.

In this case, the main scraper blades 13 rotating at high speed causes negative pressure to be generated on rear side in the rotating direction which destroys pulp mats accumulated on the inner surface of the main screen plate 10, preventing plugging of the screen plate 10.

The stock passing through the main screen plate 10 flows into the accept stock chamber 6 and is sent through the stock outlet 3 to the next process as the accepted stock.

The stock not passing through the main screen plate 10 is sent to the defibering section 20.

This stock contains contaminants such as plastics to be removed and undefibered waste paper which are accumulated. When the stock passes through the working surfaces and pockets of the defibering section 20, the undefibered waste paper in the stock is defibered by fluid shearing action caused by agitated turbulence while the contaminants such as plastics in the stock pass through the section 20 without being pulverized. The defibering section 20, whose outlet is larger in diameter than its inlet, serves for pressure increase. Therefore, the defibered waste paper and contaminants such as plastics are discharged under increased pressure to the reject chamber 7.

The stock discharged to the reject chamber 7 is diluted to a consistency suitable for screening by dilution water supplied from the dilution water inlet 18, as shown in FIG. 4. The stock is, then, divided in the auxiliary screen section 21 into the stock passing through the auxiliary screen plate 11 and that not passing through it.

In this case, the auxiliary blades 14 rotating at high speed causes negative pressure to be generated on rear side in the rotating direction which destroys pulp mats accumulated on the inner surface of the auxiliary screen plate 11, preventing plugging of the screen plate 11.

The stock, which contains new fibers defibered and capable of being withdrawn, passes through the auxiliary screen plate 11 into the circulation chamber 8 and is set back through the circulation pathway 9 in the rotor 12 and the circulation openings 17 to the main screen section 19 since pressure difference is caused inside the system due to pressure increasing effect by the defibering section 20.

The stock not passing through the auxiliary screen plate 11, i.e. contaminants larger than the pores of the screen plate 11, linger in the reject chamber 7 and are discharged out of the system as the reject through the reject outlet 4.

Table 1 shows experimental data when the apparatus for screening waste paper pulp according to the embodiment shown in FIG. 3 was used for actual screening of waste paper pulp slurry.

TABLE 1

|  |  | Conventional Screen | Invention |
|---|---|---|---|
| Processed quantity (T/D) | Stock inlet | 80 | 80 |
|  | Accept stock outlet | 60 | 76 |
|  | Reject outlet | 20 | 4 |
| Reject ratio (%) |  | 25 | 5 |
| Content of undefibered substances (%) | Stock inlet | 40 | 40 |
|  | Accept stock outlet | 5 | 5 |
|  | Reject outlet | 70 | 40 |
| Quantity of undefibered substances (T/D) | Stock inlet | 32 | 32 |
|  | Accept stock outlet | 3 | 3.8 |
|  | Reject outlet | 14 | 1.6 |
| Reduction ratio of undefibered substances (%) |  | 47 | 83 |

In this experiment, waste paper stock from cardboard with stock consistency of 1.8% was used to compare performance characteristics of a conventional screen with those of the apparatus for screening waste paper according to the present invention (as shown in FIG. 3). A pore strainer with pore diameter of 1.6 mm was used as the main screen plate and a pore strainer with pore diameter of 5 mm was used as the auxiliary screen plate.

In Table 1, the processed quantity (T/D) represents dry weight of stock; the reject ratio (%), ratio of total dry weight of reject to total dry weight of stock at inlet; the content of undefibered substances (%), dry weight of undefibered substances per unit dry weight of processed stock; the quantity of undefibered substances (T/D), total dry weight of undefibered substances in the processed stock; and the reduction ratio of undefibered substances (%), reduction ratio of total dry weight of undefibered substances after passing through the screening apparatus.

The quantity of the undefibered substances was somewhat decreased in the conventional screen, which means that more or less defibration has occurred in the screen.

As it is evident from the above test results, the reject ratio in the present system is 1/5 of that of the conventional screen whereas the quantity of undefibered substances in the accept stock in the present system was approximately the same as that of the conventional system and reduction ratio of undefibered substances in the present system is about two times as high as that of the conventional system.

In the apparatus for screening waste paper pulp according to the present invention, the defibering section 20 is incorporated to defiber the screened reject and dilution water is supplied to the reject chamber 7 to perform screening at adequate consistency. Further, the screened stock is circulated. As a result, it is possible to reduce the quantity of the reject discharged through the reject outlet 4 even when the reject ratio is more than 20% at the main screen section 19. This makes it possible to satisfy contradictory requirements, i.e. to obtain good screening effect without plugging and to reduce total reject quantity.

It is to be understood that the apparatus for screening waste paper pulp according to the present invention is not limited to the above-mentioned embodiments and that various modifications may be made without departing from the spirit of the present invention.

As is clear from the foregoing, features and advantages of the apparatus for screening waste paper pulp according to the present invention may be summarized as follows:

(1) Screening and defibering effects are attained in a single screen, which enables simplification of screening stages as well as substantial reduction of installation and running costs.
(2) Stock undefibered in the defibering section is withdrawn, which enables substantial reduction of the reject ratio and ensures higher screening degree.
(3) Coarse contaminants can be removed by the auxiliary screen section, which ensures stable operation with no contaminants caught during the circulation of the reject stock.
(4) Both coarse and fine screening processes may be attained in one and the same system when a slit strainer for fine screening is utilized in the main screen section.

What is claimed is:

1. An apparatus for screening waste paper pulp comprising:

a generally cylindrical casing having a stock inlet, an accept stock outlet and a reject outlet;

a cylindrical main screen plate concentrically fixed to define a space between an inner surface of said casing and said main screen plate;

an annular defibration stator concentrically disposed adjacent to an end of said main screen plate near said reject outlet;

an auxiliary screen plate spaced apart from said defibration stator and fixed to define a space between an inner surface of said casing and said auxiliary screen plate, wherein said auxiliary screen plate is in the form of a disk;

a rotor rotated around an axis of said casing, whereby said casing is partitioned into an inlet chamber communicated with said stock inlet and a space inside said main screen plate;

an accept stock chamber outside said main screen plate and communicated with the accept stock outlet;

a reject chamber communicated with said reject outlet and a circulation chamber outside said auxiliary screen plate, wherein said rotor includes main scraper blades faced to said main screen plate for preventing plugging of the main screen plate and wherein said casing is provided with a dilution water inlet to said reject chamber;

a defibration rotor faced to said defibration stator and auxiliary scraper blades faced to said auxiliary screen plate for preventing plugging of the auxiliary screen plate;

a circulation pathway opened to the circulation chamber; and circulation outlets on a peripheral wall of the circulation pathway for discharging the stock passing through the auxiliary screen plate toward the main screen plate, wherein said defibration stator and defibration rotor having mutually facing surfaces divergent toward said reject chamber.

2. An apparatus according to claim 1 wherein the accept stock chamber is partitioned into two chambers closer to said inlet and reject chambers, respectively.

3. An apparatus according to claim 1 wherein a pore strainer is utilized as the main screen plate.

4. An apparatus according to claim 1 wherein a slit strainer is utilized as the main screen plate.

* * * * *